H. Tilden,
Flour Sieve.
No 2,106. Reissued Nov. 14, 1865.
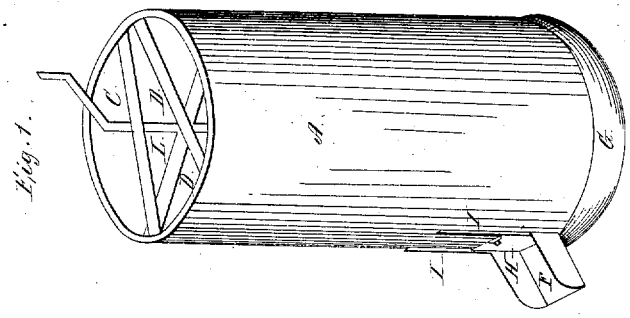
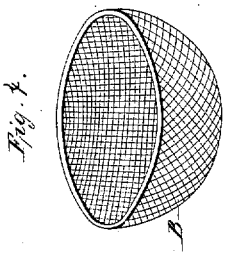
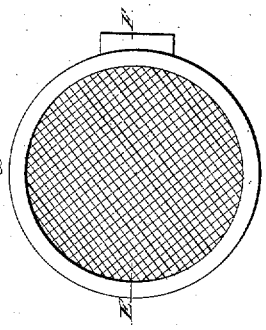
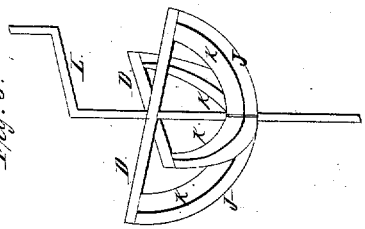
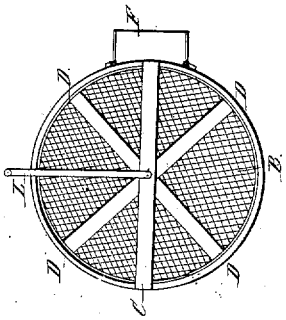
Witnesses:
Joseph H. Littlefield
F. T. Cushing
Inventor:
Howard Tilden
N. PETERS, PHOTO-LITHOGRAPHER, WASHINGTON, D. C.

UNITED STATES PATENT OFFICE.

HOWARD TILDEN, OF BOSTON, MASSACHUSETTS.

FLOUR-SIFTER.

Specification forming part of Letters Patent No. 47,756, dated May 16, 1865; Reissue No. 2,106, dated November 14, 1865.

*To all whom it may concern:*

Be it known that I, HOWARD TILDEN, of Boston, Suffolk county, and State of Massachusetts, formerly of Philadelphia, in the State of Pennsylvania, have invented certain new and useful Improvements in Flour-Sifters; and I do hereby declare that the following description and accompanying drawings are sufficient to enable any person skilled in the art or science to which it most nearly appertains to make and use my said invention or improvements, without further invention or experiment.

The nature of my invention and improvements in flour-sifters consists in making the sieve hemispherical or concave and providing a rotating stirrer to agitate the flour and force it through the sieve; also, in providing the rotary stirrer with flexible edges or scrapers adapted to press the flour through the sieve of the sifter.

In the accompanying drawings, Figure 1 is an elevation in perspective of my improved sifter. Fig. 2 is a plan or top view. Fig. 3 represents the stirrer; Fig. 4, the concave sieve. Fig. 5 is a view of the bottom of the sifter.

In the drawings, A is a cylindrical case with an enlarged base, G, to stand on, and a bar, C, across the top, which is perforated for the crank-shaft L of the stirrer to turn in. The concave sieve B (shown in Fig. 4) is fastened in the case A a short distance below the top to receive and sift the flour. This sieve B is made of woven wire and is perforated in the center for the shaft L to pass through it, and the perforation is surrounded by a small circular piece of metal, which is fastened to the sieve. The stirrer to agitate the flour in the concave sieve consists of the crank-shaft L, passing through the two straight bars D D, (which are fastened to it,) and the two curved bars or ribs K K, which are curved to suit the concavity of the sieve, and their ends are fastened to the bars or arms D D. The curved arms or bars K K are armed or provided with flexible edges or scrapers J J, which work against the inside of the concave sieve as the stirrer is turned and force the flour through the sieve. The lower end of the crank-shaft L is stepped in a socket fastened to the bottom of the case A. There is an opening through the case A to let the flour into the spout F after it is sifted, which opening is closed by the slide H fitted to traverse between the cleats I I, fastened to the case A, as shown in the drawings.

By making the sieve hemispherical or concave I get a much larger area of sifting-surface in a case or frame of a given size.

To use this sifter the flour to be sifted is put in on the sieve and the crank turned to operate the stirrer and work the flour through the sieve.

What I claim as my invention and improvement in flour-sifters is—

1. A hemispherical or concave sieve provided with a case, frame, or other proper support, for the purpose set forth.

2. In combination with a concave sieve, a rotating stirrer for agitating the flour and forcing it through the sieve.

3. In combination with a concave sieve, a a rotary stirrer armed or provided with flexible edges or scrapers and adapted to press the flour through the sieve of the sifter.

HOWARD TILDEN.

Witnesses:

HOWARD P. TILDEN,

WM. H. WARNE.